US011082004B2

(12) United States Patent
Yu et al.

(10) Patent No.: US 11,082,004 B2
(45) Date of Patent: Aug. 3, 2021

(54) SHUTDOWN CONTROL SYSTEM AND METHOD

(71) Applicant: SUNGROW POWER SUPPLY CO., LTD., Hefei (CN)

(72) Inventors: Yanfei Yu, Hefei (CN); Zongjun Yang, Hefei (CN); Hua Ni, Hefei (CN); Huajin Chen, Hefei (CN)

(73) Assignee: SUNGROW POWER SUPPLY CO., LTD., Hefei (CN)

( * ) Notice: Subject to any disclaimer, the term of this patent is extended or adjusted under 35 U.S.C. 154(b) by 60 days.

(21) Appl. No.: 16/579,724

(22) Filed: Sep. 23, 2019

(65) Prior Publication Data
US 2020/0106299 A1   Apr. 2, 2020

(30) Foreign Application Priority Data

Sep. 28, 2018  (CN) .......................... 201811141138.8

(51) Int. Cl.
*H02J 1/00*       (2006.01)
*H02J 3/00*       (2006.01)
(Continued)

(52) U.S. Cl.
CPC .............. *H02S 40/34* (2014.12); *H02J 1/10* (2013.01); *H02J 13/0003* (2013.01); *H02S 40/30* (2014.12); *H02S 40/32* (2014.12)

(58) Field of Classification Search
CPC ...... H02J 13/0003; H02J 1/10; H02J 2300/24; H02J 3/38; H02J 3/383; H02J 1/00;
(Continued)

(56) References Cited

U.S. PATENT DOCUMENTS 10,305,542 B2    5/2019   Yan et al.
2010/0139734 A1*  6/2010   Hadar .................. H01L 31/052
                                                        136/244

(Continued)

FOREIGN PATENT DOCUMENTS

CN    108270397 A    7/2018
CN    108270398 A    7/2018
CN    108418607 A    8/2018

OTHER PUBLICATIONS

First Chinese Office Action regarding Application No. 201811141138.8 dated Mar. 2, 2018. English translation provided by Unitalen Attorneys at Law.

*Primary Examiner* — Rexford N Barnie
*Assistant Examiner* — Rasem Mourad
(74) *Attorney, Agent, or Firm* — Harness, Dickey & Pierce, P.L.C.

(57) ABSTRACT

A shutdown control system and a shutdown control method are provided. A main circuit is a series circuit formed by connecting multiple shutdown circuits in series or a series-parallel circuit formed by connecting multiple such series circuits in parallel. Each shutdown circuit is connected to at least one direct current power supply. A control circuit includes a SCU and multiple PCUs corresponding to the multiple shutdown circuits. The SCU and the PCUs are configured to transmit respective mode control instructions when respective condition is satisfied. Each PCU is configured to obtain multiple criteria based on the mode control instructions from the SCU and other PCUs, determine a target operation mode of the shutdown circuit corresponding to the PCU based on the multiple criteria, and control the shutdown circuit corresponding to the PCU to operate in the target operation mode.

10 Claims, 2 Drawing Sheets

(51) Int. Cl.
     *H02S 40/34*       (2014.01)
     *H02J 1/10*        (2006.01)
     *H02J 13/00*      (2006.01)
     *H02S 40/30*      (2014.01)
     *H02S 40/32*      (2014.01)

(58) Field of Classification Search
     CPC ......... Y02E 10/56; H02S 40/30; H02S 40/32; H02S 40/34; H04B 2203/5404
     See application file for complete search history.

(56) References Cited

U.S. PATENT DOCUMENTS

2011/0121652 A1*   5/2011   Sella ................. G06Q 30/0273
                                                        307/43
2018/0041160 A1*   2/2018   Lee ......................... H02J 3/381
2018/0227012 A1     8/2018   Yan et al.

* cited by examiner

SHUTDOWN CONTROL SYSTEM AND METHOD

The present application claims priority to Chinese Patent Application No. 201811141138.8, titled "SHUTDOWN CONTROL SYSTEM AND METHOD", filed on Sep. 28, 2018 with the Chinese Patent Office, which is incorporated herein by reference in its entirety.

FIELD

The present disclosure relates to the technical field of electrical shock protection, and in particular to a shutdown control system and a shutdown control method.

BACKGROUND

In a distributed power generation system, a signal direct current power supply cannot supply enough voltage and power to meet actual demand. Therefore, multiple direct current power supplies are connected in series-parallel to meet design needs. However, since the multiple direct current power supplies are connected in series-parallel, a total output voltage value may be up to hundreds or thousands of volts. When a worker is close to the distributed power generation system, a severe electric shock accident may occur.

In an existing solution of electrical shock protection, a shutdown circuit is arranged to each of the multiple direct current power supplies. When the worker is close to the distributed power generation system, a host device is manually triggered to transmit a shutdown instruction, so as to control the shutdown circuit to turn off the corresponding direct current power supply, such that the total output voltage of the multiple direct current power supplies connected in series-parallel falls within a security voltage range. However, a fault may occur in a communication link of this solution in practices. For example, a communication signal may be absorbed or blocked. As a result, some shutdown circuits cannot receive the shutdown instruction, thereby failing to turn off the direct current power supply. In view of the above, the following improvements are made to this solution. The host device further transmits a heartbeat signal to each shutdown circuit. Once a shutdown circuit does not receive the heartbeat signal from the host device, it knows that the communication link is broken, and then turns off the corresponding direct current power supply directly.

In the improved solution, it is ensured that the direct current power supply is turned off when the communication link is broken. However, this improved solution has a problem that, in a case that a temporary or random abnormal condition occurs multiple times in the communication link, the direct current power supply may be frequently turned off, which severely affects the usability of the distributed power generation system.

SUMMARY

In view of above, a shutdown control system and a shutdown control method are provided in the present disclosure, to improve the usability of a distributed power generation system having a function of electrical shock protection.

A shutdown control system is provided, which includes a main circuit and a control circuit.

The main circuit is a series circuit formed by connecting output ends of multiple shutdown circuits in series. Alternatively, the main circuit is a series-parallel circuit formed by connecting output ends of a plurality of shutdown circuits in series to form a series circuit and connecting output ends of the multiple such series circuits in parallel. An input end of each of the multiple shutdown circuits is connected to at least one of direct current power supplies in a distributed power generation system.

The control circuit includes a system control unit (SCU) and multiple power source control units (PCU) corresponding to the multiple shutdown circuits. The SCU is configured to transmit a first mode control instruction when a first condition is satisfied, and each of the multiple PCUs is configured to transmit a second mode control instruction when a second condition is satisfied. Each of the multiple PCUs is further configured to obtain multiple criteria based on the first mode control instruction transmitted from the SCU and the second mode control instruction transmitted from another PCU in the multiple PCUs, determine a target operation mode of the shutdown circuit corresponding to the PCU based on the multiple criteria, and control the shutdown circuit corresponding to the PCU to operate in the target operation mode.

The target operation mode includes a security mode and a normal operation mode being a mode other than the security mode. In the security mode, an output voltage of the shutdown circuit corresponding to the PCU is limited to control an output voltage of the series circuit to be in a security voltage range.

In an embodiment, the SCU is configured to periodically transmit a first communication signal including an identifier (ID) of any one of the multiple PCUs. The SCU stops transmitting the first communication signal when receiving a first user command. Alternatively, the SCU is configured to determine a current PCU from the multiple PCUs in an ID polling manner, and transmit a first communication signal including an identifier (ID) of the current PCU. The SCU stops transmitting the first communication signal when receiving a first user command.

Each of the multiple PCUs is configured to transmit a second communication signal each time when receiving the first communication signal including the ID of the PCU from the SCU. The first communication signal functions as the first mode control instruction, and the second communication signal functions as the second mode control instruction.

Each of the multiple PCUs is further configured to determine whether the PCU receives one of the first communication signal including the ID of any one of the multiple PCUs from the SCU and the second communication signal from another PCU in the multiple PCUs during a preset time period. If it is determined that the PCU receives one of the first communication signal including the ID of any one of the multiple PCUs from the SCU and the second communication signal from another PCU in the multiple PCUs during the preset time period, the PCU is configured to control the shutdown circuit corresponding to the PCU to operate in the normal operation mode. If it is determined that the PCU neither receives the first communication signal including the ID of any one of the multiple PCUs from the SCU nor receives the second communication signal from another PCU in the multiple PCUs during the preset time period, the PCU is configured to control the shutdown circuit corresponding to the PCU to operate in the security mode.

In an embodiment, the SCU is configured to periodically transmit a first communication signal and a third communication signal including an ID of any one of the multiple PCUs. The SCU stops transmitting the first communication signal and the third communication signal when receiving a first user command. Alternatively, the SCU is configured to determine a current PCU from the multiple PCUs in an ID polling manner, and transmit a first communication signal and a third communication signal including an identifier (ID) of the current PCU. The SCU stops transmitting the first communication signal and the third communication signal when receiving the first user command.

Each of the multiple PCUs is configured to transmit a second communication signal each time when receiving the third communication signal including the ID of the PCU from the SCU. The first communication signal functions as the first mode control instruction, and the second communication signal functions as the second mode control instruction.

Each of the multiple PCUs is further configured to determine whether the PCU receives one of the first communication signal from the SCU and the second communication signal from another PCU in the multiple PCUs during a preset time period. If it is determined that the PCU receives one of the first communication signal from the SCU and the second communication signal from another PCU in the multiple PCUs during the preset time period, the PCU is configured to control the shutdown circuit corresponding to the PCU to operate in the normal operation mode. If it is determined that the PCU neither receives the first communication signal from the SCU nor receives the second communication signal from another PCU in the multiple PCUs during the preset time period, the PCU is configured to control the shutdown circuit corresponding to the PCU to operate in the security mode.

In an embodiment, the second communication signal includes sampling data or operation state data requested by the SCU. In a case that the SCU is configured to determine a current PCU from the multiple PCUs in an ID polling manner, the second communication signal further includes the ID of the PCU transmitting the second communication signal.

In an embodiment, each of the first communication signal and the second communication signal further includes an instruction indicating the normal operation mode.

The SCU is further configured to transmit a fourth communication signal including both the ID of the current PCU and an instruction indicating the security mode in response to the first user command.

Each of the multiple PCUs is further configured to transmit a fifth communication signal including an instruction indicating the security mode each time when receiving the fourth communication signal including both the ID of the PCU and an instruction indicating the security mode from the SCU.

The fifth communication signal further includes sampling data or operation state data requested by the SCU. In a case that the SCU is configured to determine a current PCU from the multiple PCUs in an ID polling manner, the fifth communication signal further includes the ID of the PCU transmitting the fifth communication signal.

In an embodiment, the SCU is configured to transmit a sixth communication signal including both an ID of any one of the multiple PCUs and an instruction indicating the normal operation mode in response to a second user command, and transmit a seventh communication signal including both the ID of any one of the multiple PCUs and an instruction indicating the security mode in response to a first user command. Alternatively, the SCU is configured to determine a current PCU from the multiple PCUs in an ID polling manner, and transmit a sixth communication signal including both an identifier (ID) of the current PCU and an instruction indicating the normal operation mode in response to the second user command, and transmit a seventh communication signal including both the ID of the current PCU and an instruction indicating the security mode in response to a first user command.

Each of the multiple PCUs is configured to transmit an eighth communication signal including an instruction indicating the normal operation mode each time when receiving the sixth communication signal including both the ID of the PCU and the instruction indicating the normal operation mode from the SCU, and transmit a ninth communication signal including an instruction indicating the security mode each time when receiving the seventh communication signal including both the ID of the PCU and the instruction indicating the security mode from the SCU. Each of the sixth communication signal and the seventh communication signal functions as the first mode control instruction, and each of the eighth communication signal and the ninth communication signal functions as the second mode control instruction.

Each of the multiple PCUs is further configured to control the shutdown circuit corresponding to the PCU to operate in the normal operation mode when receiving one of the sixth communication signal including the ID of any one of the multiple PCUs transmitted from the SCU and the eighth communication signal transmitted from another PCU in the multiple PCUs, and control the shutdown circuit corresponding to the PCU to operate in the security mode when receiving one of the seventh communication signal including the ID of any one of the multiple PCUs transmitted from the SCU and the ninth communication signal transmitted from another PCU in the multiple PCUs.

In an embodiment, each of the eighth communication signal and the ninth communication signal further includes sampling data or operation state data requested by the SCU. In a case that the SCU is configured to determine a current PCU from the multiple PCUs in an ID polling manner, each of the eighth communication signal and the ninth communication signal further includes the ID of the PCU transmitting the eighth communication signal or the ninth communication signal.

In an embodiment, each of the multiple PCUs is configured to control the shutdown circuit corresponding to the PCU to operate in the security mode by a way of:

controlling a voltage value of an input end of the shutdown circuit to be equal to an open circuit voltage value of the direct current power supply connected to the input end of the shutdown circuit; or controlling a current value of an input end of the shutdown circuit to be equal to a short circuit current value of the direct current power supply connected to the input end of the shutdown circuit; or controlling an input end of the shutdown circuit to be disconnected form an output end of the shutdown circuit; or controlling the shutdown circuit to be turned off; or controlling a voltage value of an input end or an output end of the shutdown circuit to be equal to a nonzero constant value; or controlling a voltage value of an input end or an output end of the shutdown circuit to periodically change in a preset range.

In an embodiment, each of the multiple shutdown circuits includes a switch and a diode. The diode is connected to an output end of the shutdown circuit in inverse-parallel. The switch is connected between an input end and the output end of the shutdown circuit. Alternatively, the switch is connected to the input end or the output end of the shutdown circuit in parallel.

Alternatively, each of the multiple shutdown circuits is a direct current/direct current (DC/DC) converter.

A shutdown control method applied to a shutdown control system is provided. The shutdown control system includes a main circuit and a control circuit. The main circuit is a series circuit formed by connecting output ends of multiple shutdown circuits in series. Alternatively, the main circuit is a series-parallel circuit formed by connecting output ends of a plurality of shutdown circuits in series to form a series circuit and connecting output ends of multiple such series circuits in parallel. An input end of each of the multiple shutdown circuits is connected to at least one of direct current power supplies in a distributed power generation system.

The control circuit includes a system control unit (SCU) and multiple power source control units (PCU) corresponding to the multiple shutdown circuits.

The shutdown control method includes: transmitting, by the SCU, a first mode control instruction when a first condition is satisfied; transmitting, by each of the multiple PCUs, a second mode control instruction when a second condition is satisfied; and obtaining, by each of the multiple PCUs, multiple criteria based on the first mode control instruction transmitted from the SCU and the second mode control instruction transmitted from another PCU in the multiple PCUs, determining, by the PCU, a target operation mode of the shutdown circuit corresponding to the PCU based on the multiple criteria, and controlling, by the PCU, the shutdown circuit corresponding to the PCU to operate in the target operation mode.

The target operation mode includes a security mode and a normal operation mode being a mode other than the security mode. In the security mode, an output voltage of the shutdown circuit corresponding to the PCU is limited to control an output voltage of the series circuit to be in a security voltage range.

It can be seen from the above technical solutions, each of the multiple PCUs can determine the target operation mode of the shutdown circuit corresponding to the PCU based on not only the first mode control instruction transmitted from the SCU but also the second mode control instruction transmitted from any other PCUs, and control the shutdown circuit corresponding to the PCU to operate based on the determination result. Even if the PCU cannot receive a mode control instruction transmitted via one of the communication links due to a fault occurring in the communication link, the PCU can still determine correctly based on the mode control instruction transmitted from another communication link, so as to prevent the shutdown circuit from operating in a wrong mode when the PCU fails to receive a mode control instruction, thereby avoiding the effect on the usability of the distributed power generation system due to the failure of receiving a control instruction from a single source.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

Hereinafter, technical solutions in the embodiments of the present disclosure are clearly and completely described with reference to the drawings in the embodiments of the present disclosure. It is apparent that the embodiments described herein are only parts not all embodiments of the present disclosure. Based on the embodiments of the present disclosure, all of other embodiments obtained by those skilled in the art without any creative work should fall within the scope of protection of the present disclosure.

Figure 1:
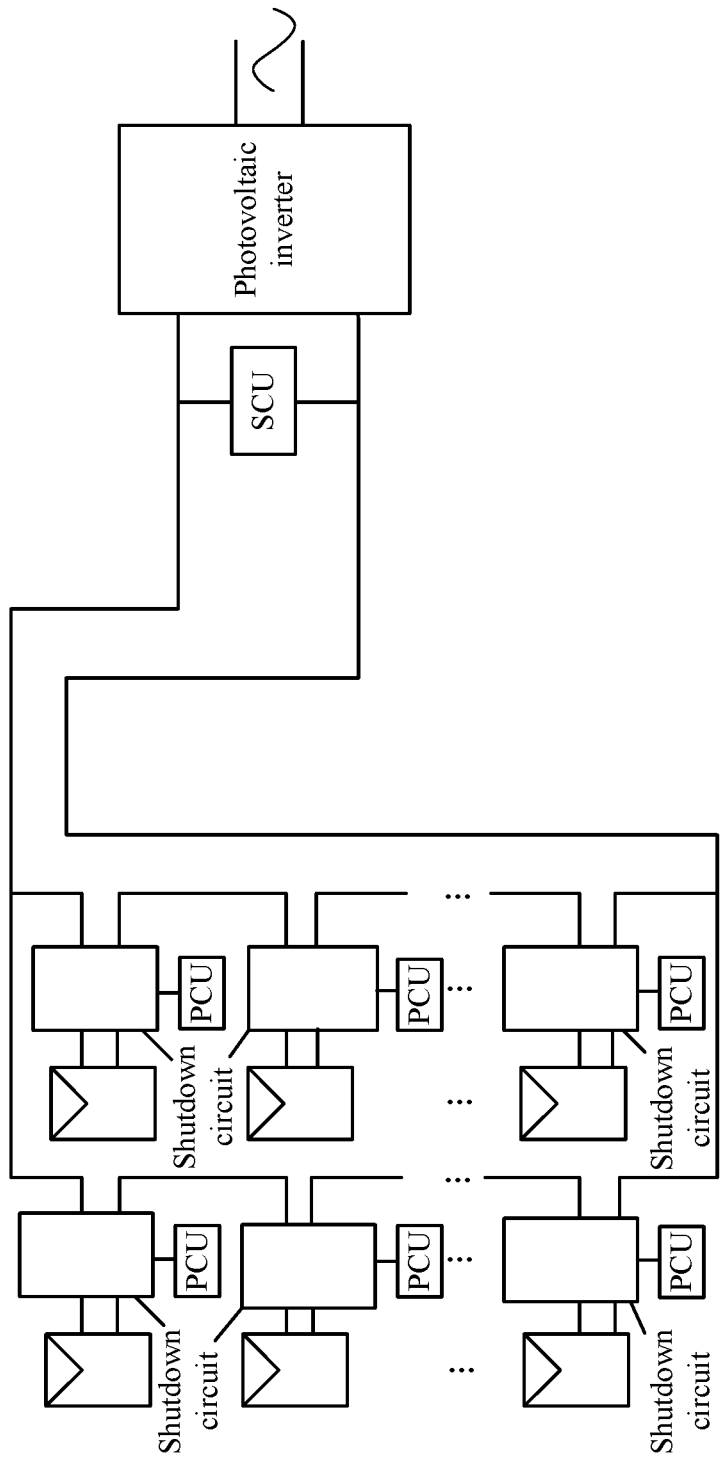
FIG. 1 is a schematic structural diagram of a shutdown control system according to an embodiment of the present disclosure.

Referring to FIG. 1, a shutdown control system is provided according to an embodiment of the present disclosure. A main circuit of the shutdown control system is a series circuit formed by connecting output ends of multiple shutdown circuits in series. Alternatively, the main circuit of the shutdown control system is a series-parallel circuit formed by connecting output ends of multiple shutdown circuits in series to form a series circuit, and connecting output ends of multiple such series circuits in parallel. An input end of each of the multiple shutdown circuits is connected to at least one of direct current power supplies in a distributed power generation system. In a case that an input end of any one of the multiple shutdown circuits is connected to multiple direct current power supplies, the multiple direct current power supplies may be connected in series, parallel or series-parallel. It can be seen from the above, each of the direct current power supplies in the distributed power generation system is provided with a shutdown circuit. Any one of the shutdown circuits may be provided to one direct current power supply, or may be shared by multiple direct current power supplies.

The shutdown control system may be applied to a distributed power generation system using photovoltaic modules as the direct current power supplies (hereinafter refer to as photovoltaic system). The shutdown control system may also be applied to a distributed power generation system using storage batteries, super capacitors or fuel batteries as the direct current power supplies, which is not limited herein. In an example shown in FIG. 1, the shutdown control system is applied to the photovoltaic system including two series circuits, and each of the photovoltaic modules is provided with one shutdown circuit separately.

Still referring to FIG. 1, a control circuit of the shutdown control system includes a system control unit (SCU) and multiple power source control units (PCU) corresponding to the multiple shutdown circuits. The multiple shutdown circuits and the multiple PCUs may be provided in a one-to-one correspondence. Alternatively, the multiple shutdown circuits may be divided into multiple groups and each group is connected to one PCU. The SCU is configured to transmit a first mode control instruction when a first condition is satisfied, and each of the PCUs is configured to transmit a second mode control instruction when a second condition is satisfied. Each of the multiple PCUs is configured to obtain multiple criteria based on the first mode control instruction transmitted from the SCU and the second mode control instruction transmitted from another PCU in the multiple PCUs, determine a target operation mode of the shutdown circuit corresponding to the PCU based on the multiple criteria, and control the shutdown circuit corresponding to the PCU to operate in the target operation mode.

The target operation mode of the shutdown circuit includes a security mode and a normal operation mode. The security mode and the normal operation mode of the shutdown circuit are defined based on whether the shutdown circuit performs electrical shock protection or not. The normal operation mode is a mode other than the security mode.

In some embodiments, in the normal operation mode, the distributed power generation system is controlled to normally operate as required without regarding a risk of electric shock. For example, the distributed power generation system operates at maximum power or limited power or is on standby based on the practical conditions.

In the security mode, an output voltage of the shutdown circuit corresponding to the PCU is limited, such that an output voltage (hereinafter refer to as a string voltage) of the series circuit falls within a security voltage range, so as to avoid an electric shock accident when a worker is closed to the distributed power generation system. The limited output voltage of the shutdown circuit is determined based on actual conditions. For example, according to the US NEC 2017, a photovoltaic system mounted on a building is required to have a rapid shutdown function, and after the photovoltaic system is turned off, a voltage of an electric conductor located beyond a distance of 0.3 m from the photovoltaic system should not exceed a value of 30V. In this case, for a series circuit formed by connecting 22 shutdown circuits in series, each of the shutdown circuits may operate in a security mode in which an output voltage of the shutdown circuit is less than 1V, such that the string voltage does not exceed a value of 22V, satisfying the security requirement of 30V.

It can be seen from the above, each of the multiple PCUs can determine the target operation mode of the shutdown circuit corresponding to the PCU based on not only the first mode control instruction transmitted from the SCU but also the second mode control instruction transmitted from any other PCUs, and control the shutdown circuit corresponding to the PCU to operate based on the determination result. Even if the PCU cannot receive a mode control instruction transmitted via one of the communication links due to a fault occurring in the communication link, the PCU can still determine correctly based on the mode control instruction transmitted from another communication link, so as to prevent the shutdown circuit from operating in a wrong mode when the PCU fails to receive a mode control instruction, thereby avoiding the effect on the usability of the distributed power generation system due to the failure of receiving a control instruction from a single source.

In embodiments of the present disclosure, the PCU is configure to control the shutdown circuit to operate in the security mode by a way of controlling the shutdown circuit to operate in a security mode in which the output voltage value of the shutdown circuit is equal to zero, or controlling the shutdown circuit to operate in a security mode in which the output voltage value of the shutdown circuit is not equal to zero, which are described in detail below.

The controlling the shutdown circuit to operate in a security mode in which the output voltage value of the shutdown circuit is equal to zero may be implemented by at least the following three methods. In a first method, a voltage value of an input end of the shutdown circuit is controlled to be equal to an open circuit voltage value of a direct current power supply connected to the input end of the shutdown circuit. In this case, an output current value of the direct current power supply connected to the input end of the shutdown circuit is equal to zero, and thus there is no power transmitted to an output end of the shutdown circuit, thereby avoiding the electric shock accident. In a second method, the current value of the input end of the shutdown circuit is controlled to be equal to a short circuit current value of the direct current power supply connected to the input end of the shutdown circuit. In this case, the voltage value of the input end of the shutdown circuit is equal to zero, and thus there is no power transmitted to the output end of the shutdown circuit, thereby avoiding the electric shock accident. In a third method, the input end of the shutdown circuit is disconnected from the output end of the shutdown circuit, or the shutdown circuit is controlled to be turned off.

The controlling the shutdown circuit to operate in a security mode in which the output voltage value of the shutdown circuit is not equal to zero may be implemented by at least the following two methods. In a first method, the voltage value of the input end (or the output end) of the shutdown circuit is controlled to be kept at a preset value not equal to zero. In a second method, the voltage value of the input end (or the output end) of the shutdown circuit is controlled to periodically change in a preset range.

It should be noted that, the security modes of the multiple shutdown circuits in a same shutdown control system may be implemented by different methods or by a same method, which is not limited herein. Normally, the PCU is powered by a direct current power supply on a front end of the corresponding shutdown circuit. In a case that the direct current power supply cannot supply power to the PCU (for example, in a case that the current value of the input end of the shutdown circuit is controlled to be equal to the short circuit current value of the direct current power supply connected to the input end of the shutdown circuit), the PCU may be powered by another direct current power supply that is not short-circuited or by an additional storage battery.

A topology of the shutdown circuit is described below. The shutdown circuit includes a switching device. The switching device is configured to switch between the operation modes of the shutdown circuit.

Figure 2:
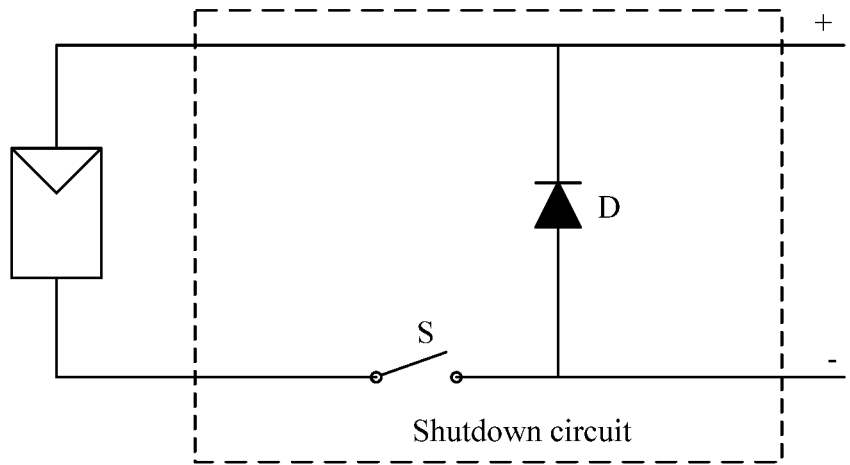
FIG. 2 is a schematic structural diagram of a shutdown circuit according to an embodiment of the present disclosure.

For example, in the topology shown in FIG. 2, a shutdown circuit includes a switch S and a diode D. The switch S is connected between an input end and an output end of the shutdown circuit. The diode D is connected to the output end of the shutdown circuit in inverse-parallel. The operation principle of the shutdown circuit is described as follows. When the switch S is turned on, the input end is connected to the output end of the shutdown circuit, such that the shutdown circuit operates in the normal operation mode. When the switch S is turned off, a current loop between the input end and the output end of the shutdown circuit is cut off, such that the shutdown circuit operates in the security mode in which an output voltage value of the shutdown circuit is equal to zero. Alternatively, the switch S is turned on and off alternately (for example, in a pulse width modulation (PWM) manner with a fixed duty cycle or in a hysteresis comparing PWM manner), to alternately connect and disconnect the input end and the output end of the shutdown circuit, so as to output a smooth waveform in cooperation with an inductor and a capacitor (or a parasitic capacitance and a parasitic inductance), such that a voltage value of the output end of the shutdown circuit is kept at a preset value. The diode D is configured to provide a bypass path for a current of a series circuit when the switch S is turned off.

Alternatively, the switch S may be connected to the input end or the output end of the shutdown circuit in parallel. When the switch S is turned off, the shutdown circuit operates in the normal operation mode. When the switch S is turned on, the voltage value of the output end of the shutdown circuit is reduced to zero. Alternatively, the switch S is turned on and off alternately, such that the voltage value of the output end of the shutdown circuit is kept at a preset value.

Alternatively, the shutdown circuit may also be a DC/DC converter, such as a buck converter, a boost converter, or a buck-boost converter. The DC/DC converter may be switched to the normal operation mode or the security mode by controlling a state of a switch in the DC/DC converter.

The SCU may be a physically separated device, as shown in FIG. 1. Alternatively, the SCU may be integrated in an existing device of the distributed power generation system to improve the integration level of the distributed power generation system and reduce cost. For example, the SCU is integrated in a photovoltaic inverter.

Each of the PCUs includes a receiver, a transmitter and a controller. The receiver is configured to receive signals transmitted from the SCU and another PCU in the multiple PCUs, and transmit the signals to the controller. The controller is configured to analyze and process the received signals. For example, the controller analyzes received mode control instructions from the external devices (the SCU and the other PCUs), to determine whether to control the shutdown circuit to operate in the normal operation mode or the security mode, and generates a control signal corresponding to the determined mode to control the operation of the shutdown circuit. The controller transmits a communication signal via the transmitter. In this case, the PCU generally has a unique device identifier (ID). In a case that the controller identifies a mode control instruction including the ID of the PCU and requiring a response communication signal, among mode control instructions received by the receiver, the transmitter transmits a response communication signal. Generally, the response communication signal also includes the ID of the PCU. In order to improve the integration level of the distributed power generation system and reduce the cost, the transmitter and the receiver in a same PCU may share a part of circuit, and multiple shutdown circuits may be controlled by a same PCU.

In any one of the embodiments disclosed above, a program in the control circuit may have one of at least the following three control logics.

First Control Logic

In a first control logic, the SCU is configured to periodically transmit a first communication signal including an ID of any one of the multiple PCUs. The SCU stops transmitting the first communication signal when receiving a first user command. Alternatively, the SCU is configured to determine a current PCU from the multiple PCUs in an ID polling manner, and transmit a first communication signal including an identifier (ID) of the current PCU. The SCU stops transmitting the first communication signal when receiving the first user command. The first user command is a command to start performing the electrical shock protection function of the shutdown control system, i.e., a command used to control the shutdown circuit to operate in the security mode (which is defined in the same way in the following control logics).

Each of the multiple PCUs is configured to transmit a second communication signal each time when receiving the first communication signal including the ID of the PCU from the SCU. The first communication signal transmitted from the SCU functions as the first mode control instruction and the second communication signal transmitted from the PCU functions as the second mode control instruction.

Each of the multiple PCUs is further configured to determine whether the PCU receives one of the first communication signal including the ID of any one of the multiple PCUs from the SCU and the second communication signal from another PCU in the multiple PCUs during a preset time period T1. If it is determined that the PCU receives one of the first communication signal including the ID of any one of the multiple PCUs from the SCU and the second communication signal from another PCU in the multiple PCUs during the preset time period T1, the PCU is configured to control the shutdown circuit corresponding to the PCU to operate in the normal operation mode. If it is determined that the PCU neither receives the first communication signal including the ID of any one of the multiple PCUs from the SCU nor receives the second communication signal from any PCU in the multiple PCUs during the preset time period T1, the PCU is configured to control the shutdown circuit corresponding to the PCU to operate in the security mode.

In the first control logic, the first communication signal transmitted from the SCU not only functions as the mode control instruction but also is used to control some PCUs to transmit the second communication signal. In a case of good communication in the shutdown control system, the first communication signal including the ID of any one of the multiple PCUs transmitted from the SCU can be received by all of the multiple PCUs, and the second communication signal transmitted from any one of the multiple PCUs can be received by all of the other PCUs. In this case, each of the multiple PCUs can determine a correct operation mode based on not only the first communication signal transmitted from the SCU but also the second communication signal transmitted from any one of the other PCUs. If the PCU receives only some of the communication signals during the preset time period T1 due to poor communication, for example, if the PCU receives only the second communication signal transmitted from only one of the other PCUs, the PCU can still control the shutdown circuit corresponding to the PCU to operate in a correct operation mode, instead of controlling the shutdown circuit corresponding to the PCU to operate in a wrong security mode when failing to receive the first communication signal transmitted from the SCU, thereby improving the usability of the distributed power generation system. The larger number of the PCUs transmitting the second communication signals leads to a higher reliability of the shutdown control system.

In the control circuit, the SCU and the multiple PCUs use a same communication interval. For example, the SCU and the multiple PCUs are coupled to a direct current power line (the way that the SCU is connected between a positive end and a negative end of the direct current power line as shown in FIG. 1 is only an example, and the SCU may be coupled to the direct current power line via a current transformer in practice), and communicate to each other by means of power line carrier (PLC) communication. In this case, an anti-collision mechanism is adopted in some embodiments to avoid the communication collision caused by multiple PCUs simultaneously transmitting the second communication signals in response to the signal transmitted from the SCU and avoid the communication collision caused by two PCUs simultaneously transmitting the second communication signals to each other. In the anti-collision mechanism, an ID list including IDs of the multiple PCUs is prestored in the SCU. The IDs of the multiple PCUs are different from each other. The ID of the PCU may be an identification number, such as an identification number of 1706031234 including a date and a serial number, which is prestored in the PCU in the factory. Alternatively, the ID of the PCU may be an identification number manually set when being used, such as an identification number inputted via a dip switch, a push button, a touch screen on the PCU or via a master computer for communication interaction. Alternatively, the ID of the PCU may be a communication address dynamically assigned based on a communication network, such as a communication address ranging from 001 to 255 dynamically assigned based on a Modbus protocol. The SCU determines a current ID from the ID list in a rolling manner and transmits a first communication signal including the current ID to all of the multiple PCUs. Each of the multiple PCUs analyzes information of the ID in the first communication signal after receiving the first communication signal, and compares the ID in the first communication signal with its own ID. If the ID in the first communication signal is identical to the ID of the PCU, the PCU transmits a second communication. In this way, different PCUs transmit the second communication signals at different time periods, thereby avoiding the communication collision.

Second Control Logic

In a second control logic, the SCU is configured to periodically transmit a first communication signal and a third communication signal including an ID of any one of the multiple PCUs. The SCU stops transmitting the first communication signal and the third communication signal when receiving a first user command. Alternatively, the SCU is configured to determine a current PCU from the multiple PCUs in an ID polling manner, and transmit a first communication signal and a third communication signal including the ID of the current PCU. The SCU stops transmitting the first communication signal and the third communication signal when receiving the first user command.

Each of the multiple PCUs is configured to transmit a second communication signal each time when receiving the third communication signal including the ID of the PCU from the SCU. The first communication signal transmitted from the SCU functions as the first mode control instruction, and the second communication signal transmitted from the PCU functions as the second mode control instruction.

Each of the multiple PCUs is further configured to determine whether the PCU receives one of the first communication signal from the SCU and the second communication signal from another PCU in the multiple PCUs during a preset time period. If it is determined that the PCU receives one of the first communication signal from the SCU and the second communication signal from another PCU in the multiple PCUs during the preset time period, the PCU is configured to control the shutdown circuit corresponding to the PCU to operate in the normal operation mode. If it is determined that the PCU neither receives the first communication signal from the SCU nor receives the second communication signal from any other PCU in the multiple PCUs during the preset time period, the PCU is configured to control the shutdown circuit corresponding to the PCU to operate in the security mode.

A difference between the second control logic and the first control logic is as follows. In the second control logic, the first communication signal transmitted from the SCU functions as only the mode control instruction, and the SCU transmits the third communication signal to control the PCUs to transmit the second communication signal. For the operation principles of the second control logic, one may refer to the description of the first control logic, which is not described in detail herein.

In some embodiments, in the first control logic and the second control logic, the second communication signal transmitted from the PCU may be received also by the SCU. The second communication signal may include sampling data or operation state data of the PCU. The sampling data may be, for example, data inputted to the PCU or outputted from the PCU. The operation state data may be, for example, an operational duration of the PCU, data indicating whether the PCU operates abnormally, or the like. In a case that more than one PCU transmit second communication signals to the SCU, each of the second communication signals further includes an ID of the PCU transmitting the second communication signal, such that the SCU can distinguish the second communication signals transmitted from different PCUs. In a case that only one PCU transmits a second communication signal to the SCU, the second communication signal may or may not include an ID of the PCU.

In addition, it should be noted that, in the first control logic and the second control logic, when the SCU stops transmitting the first communication signal or the PCU stops transmitting the second communication signal, the SCU or the PCU may still transmit other communication signals, as long as the other communication signals are distinguishable from the first communication signal and the second communication signal. The other communication signals may be distinguished from the first communication signal and the second communication signal by instructions included in the communication signals. For example, each of the first communication signal and the second communication signal includes an instruction indicating the normal operation mode. The SCU transmits a fourth communication signal including both the ID of the current PCU and an instruction indicating the security mode after receiving the first user command. The PCU is further configured to transmit a fifth communication signal including an instruction indicating the security mode each time when receiving the fourth communication signal including both the ID of the PCU and the instruction indicating the security mode from the SCU. In this case, even if the PCU stops transmitting the second communication signal, data required for responding to the SCU may be carried in the fifth communication signal. In a case that several PCUs transmit the fifth communication signals to the SCU, each of the fifth communication signals may further include an ID of the PCU transmitting the fifth communication signal, such that the SCU can distinguish the fifth communication signals transmitted from different PCUs.

Third Control Logic

In a third control logic, the SCU is configured to transmit a sixth communication signal including both an ID of any one of the multiple PCUs and an instruction indicating the normal operation mode in response to a second user command, and transmit a seventh communication signal including both the ID of any one of the multiple PCUs and an instruction indicating the security mode in response to a first user command. Alternatively, the SCU is configured to determine a current PCU from the multiple PCUs in an ID polling manner, and transmit a sixth communication signal including both the ID of the current PCU and an instruction indicating the normal operation mode in response to the second user command, and transmit a seventh communication signal including both the ID of the current PCU and an instruction indicating the security mode in response to a first user command.

Each of the multiple PCUs is configured to transmit an eighth communication signal including an instruction indicating the normal operation mode each time when receiving the sixth communication signal including both the ID of the PCU and the instruction indicating the normal operation mode from the SCU, and transmit a ninth communication signal including an instruction indicating the security mode each time when receiving the seventh communication signal including both the ID of the PCU and the instruction indicating the security mode from the SCU. Each of the sixth communication signal and the seventh communication signal functions as the first mode control instruction, and each of the eighth communication signal and the ninth communication signal functions as the second mode control instruction.

Each of the multiple PCUs is further configured to control the shutdown circuit corresponding to the PCU to operate in the normal operation mode when receiving the sixth communication signal including the ID of any one of the multiple PCUs transmitted from the SCU and when receiving the eighth communication signal transmitted from another PCU in the multiple PCUs, and control the shutdown circuit corresponding to the PCU to operate in the security mode when receiving the seventh communication signal including the ID of any one of the multiple PCUs transmitted from the SCU and when receiving the ninth communication signal transmitted from another PCU in the multiple PCUs.

A difference between the third control logic and the first control logic is as follows. In the first control logic, the shutdown circuit is controlled to operate in the normal operation mode or the security mode by transmitting or stopping transmitting one communication signal. However, in the third control logic, the shutdown circuit is controlled to operate in the normal operation mode or the security mode by transmitting two communication signals including different instructions.

In some embodiments, in the third control logic, the eighth communication signal and the ninth communication signal each may include sampling data or operation state data of the PCU, to response to the SCU. In a case that more than one PCU transmit the eighth communication signals and the ninth communication signals to the SCU, each of the eighth communication signals and the ninth communication signals further includes an ID of the PCU transmitting the eighth or ninth communication signal.

Corresponding to the above embodiments of the shutdown control system, a shutdown control method is further provided according to an embodiment of the present disclosure. The shutdown control method is applied to the shutdown control system. The shutdown control system includes a main circuit and a control circuit. The main circuit is a series circuit formed by connecting output ends of multiple shutdown circuits in series. Alternatively, the main circuit is a series-parallel circuit formed by connecting output ends of multiple shutdown circuits in series to form a series circuit and connecting output ends of multiple such series circuits in parallel. An input end of each of the multiple shutdown circuits is connected to at least one of direct current power supplies in a distributed power generation system.

The control circuit includes a SCU and multiple PCUs corresponding to the multiple shutdown circuits.

Figure 3:
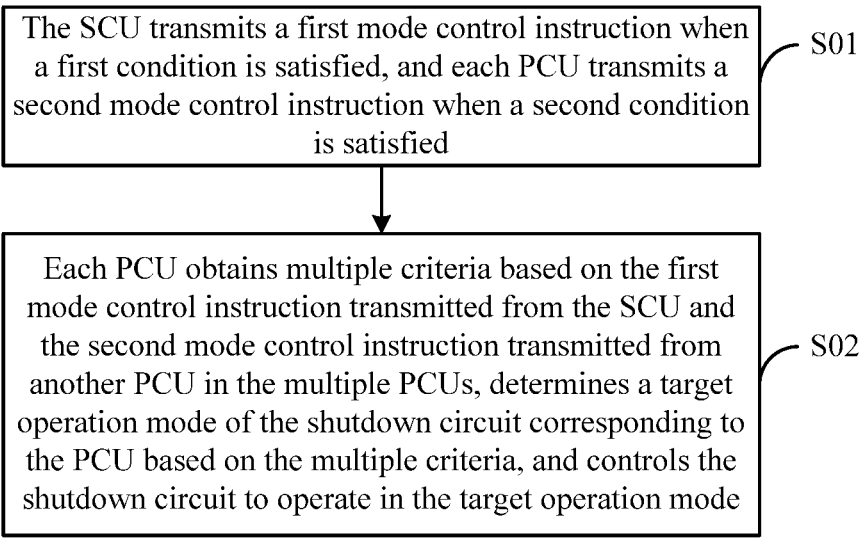
FIG. 3 is a flowchart of a shutdown control method according to an embodiment of the present disclosure.

Referring to FIG. 3, the shutdown control method includes the following steps S01 to S02.

In step S01, the SCU transmits a first mode control instruction when a first condition is satisfied, and each of the PCUs transmits a second mode control instruction when a second condition is satisfied.

In step S02, each of the multiple PCUs obtains multiple criteria based on the first mode control instruction transmitted from the SCU and the second mode control instruction transmitted from another PCU in the multiple PCUs, determines a target operation mode of the shutdown circuit corresponding to the PCU based on the multiple criteria, and controls the shutdown circuit corresponding to the PCU to operate in the target operation mode.

The target operation mode includes a security mode and a normal operation mode. In the security mode, an output voltage of the shutdown circuit corresponding to the PCU is limited, such that an output voltage of the series circuit falls within a security voltage range. The normal operation mode is a mode other than the security mode.

The embodiments in this specification are described in a progressive way, each of which emphasizes the differences from others, and the same or similar parts in the embodiments can be referred to each other. Since the disclosed shutdown control method corresponds to the disclosed shutdown control system, the description thereof is relatively simple, and for specific control logics involved in the shutdown control method, references may be made to the description of the shutdown control system.

The description of the embodiments disclosed above enables those skilled in the art to implement or use the present disclosure. Numerous modifications to the embodiments are apparent to those skilled in the art, and the general principles defined herein can be implemented in other embodiments without deviating from the spirit or scope of the present disclosure. Therefore, the present disclosure may not be limited to the embodiments described herein, but is in accordance with the widest scope consistent with the principles and novel features disclosed herein.

The invention claimed is:

1. A shutdown control system, comprising:
a main circuit being a series circuit formed by connecting output ends of a plurality of shutdown circuits in series or a series-parallel circuit formed by connecting output ends of a plurality of shutdown circuits in series to form a series circuit and connecting output ends of a plurality of the series circuits in parallel, wherein an input end of each of the plurality of shutdown circuits is connected to at least one of direct current power supplies in a distributed power generation system; and
a control circuit comprising a system control unit (SCU) and a plurality of power source control units (PCU) corresponding to the plurality of shutdown circuits, wherein
the SCU is configured to transmit a first mode control instruction to each of the plurality of PCUs when a first condition is satisfied, the first mode control instruction comprising an ID of the PCU receiving the first mode control instruction, and each of the plurality of PCUs is configured to transmit a second mode control instruction to all other PCUs upon receiving the first mode control instruction comprising the ID of the PCU from the SCU;
each of the plurality of PCUs is further configured to determine a target operation mode of the shutdown circuit corresponding to the PCU based on the first mode control instruction transmitted from the SCU and the second mode control instruction transmitted from another PCU in the plurality of PCUs, and control the shutdown circuit corresponding to the PCU to operate in the target operation mode; and the target operation mode comprises a security mode and a normal operation being a mode other than the security mode, and in the security mode, an output voltage of the shutdown circuit corresponding to the PCU is limited to control an output voltage of the series circuit to be in a security voltage range.

2. The shutdown control system according to claim 1, wherein the SCU is configured to periodically transmit a first communication signal comprising an identifier (ID) of any one of the plurality of PCUs, and stop transmitting the first communication signal when receiving a first user command; or the SCU is configured to determine a current PCU from the plurality of PCUs in an ID polling manner, transmit a first communication signal comprising an identifier (ID) of the current PCU, and stop transmitting the first communication signal when receiving a first user command;

each of the plurality of PCUs is configured to transmit a second communication signal each time when receiving the first communication signal comprising the ID of the PCU from the SCU, wherein the first communication signal functions as the first mode control instruction, and the second communication signal functions as the second mode control instruction; and each of the plurality of PCUs is further configured to determine whether the PCU receives one of the first communication signal comprising the ID of any one of the plurality of PCUs from the SCU and the second communication signal from another PCU in the plurality of PCUs during a preset time period, control the shutdown circuit corresponding to the PCU to operate in the normal operation mode in a case of positive determination, and control the shutdown circuit corresponding to the PCU to operate in the security mode in a case of negative determination.

3. The shutdown control system according to claim 1, wherein the SCU is configured to periodically transmit a first communication signal and a third communication signal comprising an identifier (ID) of any one of the plurality of PCUs, and stop transmitting the first communication signal and the third communication signal when receiving a first user command; or the SCU is configured to determine a current PCU from the plurality of PCUs in an ID polling manner, and transmit a first communication signal and a third communication signal comprising an identifier (ID) of the current PCU, and stop transmitting the first communication signal and the third communication signal when receiving a first user command;

each of the plurality of PCUs is configured to transmit a second communication signal each time when receiving the third communication signal comprising the ID of the PCU from the SCU, wherein the first communication signal functions as the first mode control instruction, and the second communication signal functions as the second mode control instruction; and each of the plurality of PCUs is further configured to determine whether the PCU receives one of the first communication signal from the SCU and the second communication signal from another PCU in the plurality of PCUs during a preset time period, control the shutdown circuit corresponding to the PCU to operate in the normal operation mode in a case of positive determination, and control the shutdown circuit corresponding to the PCU to operate in the security mode in a case of negative determination.

4. The shutdown control system according to claim 2, wherein the second communication signal comprises sampling data or operation state data requested by the SCU; and the second communication signal further comprises the ID of the PCU transmitting the second communication signal in a case that the SCU is configured to determine a current PCU from the plurality of PCUs in an ID polling manner.

5. The shutdown control system according to claim 4, wherein each of the first communication signal and the second communication signal further comprises an instruction indicating the normal operation mode;

the SCU is further configured to transmit a fourth communication signal comprising both the ID of the current PCU and an instruction indicating the security mode in response to the first user command;

each of the plurality of PCUs is further configured to transmit a fifth communication signal comprising an instruction indicating the security mode each time when receiving the fourth communication signal comprising both the ID of the PCU and the instruction indicating the security mode from the SCU; and the fifth communication signal further comprises sampling data or operation state data requested by the SCU; and the fifth communication signal further comprises the ID of the PCU transmitting the fifth communication signal in a case that the SCU is configured to determine a current PCU from the plurality of PCUs in an ID polling manner.

6. The shutdown control system according to claim 1, wherein the SCU is configured to transmit a sixth communication signal comprising both an identifier (ID) of any one of the plurality of PCUs and an instruction indicating the normal operation mode in response to a second user command, and transmit a seventh communication signal comprising both the ID of any one of the plurality of PCUs and an instruction indicating the security mode in response to a first user command; or the SCU is configured to determine a current PCU from the plurality of PCUs in an ID polling manner, and transmit a sixth communication signal comprising both an identifier (ID) of the current PCU and an instruction indicating the normal operation mode in response to the second user command, and transmit a seventh communication signal comprising both the identifier (ID) of the current PCU and an instruction indicating the security mode in response to the first user command;

each of the plurality of PCUs is configured to transmit an eighth communication signal comprising an instruction indicating the normal operation mode each time when receiving the sixth communication signal comprising both the ID of the PCU and the instruction indicating the normal operation mode from the SCU, and transmit a ninth communication signal comprising an instruction indicating the security mode each time when receiving the seventh communication signal comprising both the ID of the PCU and the instruction indicating the security mode from the SCU, wherein each of the sixth communication signal and the seventh communication signal functions as the first mode control instruction, and each of the eighth communication signal and the ninth communication signal functions as the second mode control instruction; and each of the plurality of PCUs is further configured to control the shutdown circuit corresponding to the PCU to operate in the normal operation mode when receiving one of the sixth communication signal comprising the ID of any one of the plurality of PCUs transmitted from the SCU and the eighth communication signal transmitted from another PCU in the plurality of PCUs, and control the shutdown circuit corresponding to the PCU to operate in the security mode when receiving one of the seventh communication signal comprising the ID of any one of the plurality of PCUs transmitted from the SCU and the ninth communication signal transmitted from another PCU in the plurality of PCUs.

7. The shutdown control system according to claim 6, wherein each of the eighth communication signal and the ninth communication signal further comprises sampling data or operation state data requested by the SCU; and each of the eighth communication signal and the ninth communication signal further comprises the ID of the PCU transmitting the eighth communication signal or the ninth communication signal in a case that the SCU is configured to determine a current PCU from the plurality of PCUs in an ID polling manner.

8. The shutdown control system according to claim 1, wherein each of the plurality of PCUs is configured to control the shutdown circuit corresponding to the PCU to operate in the security mode by a way of:

controlling a voltage value of an input end of the shutdown circuit to be equal to an open circuit voltage value of the direct current power supply connected to the input end of the shutdown circuit; or controlling a current value of an input end of the shutdown circuit to be equal to a short circuit current value of the direct current power supply connected to the input end of the shutdown circuit; or controlling an input end of the shutdown circuit to be disconnected from an output end of the shutdown circuit; or controlling the shutdown circuit to be turned off; or controlling a voltage value of an input end or an output end of the shutdown circuit to be equal a nonzero constant value; or controlling a voltage value of an input end or an output end of the shutdown circuit to periodically change in a preset range.

9. The shutdown control system according to claim 8, wherein each of the plurality of shutdown circuits comprises a diode connected to an output end of the shutdown circuit in inverse-parallel, and a switch connected between an input end and the output end of the shutdown circuit or connected to an input end or the output end of the shutdown circuit in parallel; or each of the plurality of shutdown circuits is a direct current/direct current (DC/DC) converter.

10. A shutdown control method, applied to a shutdown control system comprising a main circuit and a control circuit, wherein the main circuit is a series circuit formed by connecting output ends of a plurality of shutdown circuits in series or a series-parallel circuit formed by connecting output ends of a plurality of shutdown circuits in series to form a series circuit and connecting output ends of a plurality of the series circuits in parallel, wherein an input end of each of the plurality of shutdown circuits is connected to at least one of direct current power supplies in a distributed power generation system; and the control circuit comprises a system control unit (SCU) and a plurality of power source control units (PCU) corresponding to the plurality of shutdown circuits, and wherein the method comprises:

transmitting, by the SCU, a first mode control instruction to each of the plurality of PCUs when a first condition is satisfied, wherein the first mode control instruction comprises an ID of the PCU receiving the first mode control instruction;

transmitting, by each of the plurality of PCUs, a second mode control instruction to all other PCUs upon receiving the first mode control instruction comprising the ID of the PCU from the SCU; and determining, by each of the plurality of PCUs, a target operation mode of the shutdown circuit corresponding to the PCU based on the first mode control instruction transmitted from the SCU and the second mode control instruction transmitted from another PCU in the plurality of PCUs, and controlling, by the PCU, the shutdown circuit corresponding to the PCU to operate in the target operation mode;

wherein the target operation mode comprises a security mode and a normal operation mode being a mode other than the security mode, and in the security mode, an output voltage of the shutdown circuit corresponding to the PCU is limited to control an output voltage of the series circuit to be in a security voltage range.

* * * * *